United States Patent
Teshiba et al.

(10) Patent No.: US 8,891,945 B2
(45) Date of Patent: Nov. 18, 2014

(54) RECORDING/REPRODUCING METHOD AND RECORDING/REPRODUCING DEVICE

(75) Inventors: Satoshi Teshiba, Osaka (JP); Yusuke Shiroyama, Osaka (JP); Futoshi Ushio, Osaka (JP); Tadayoshi Ishikawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 719 days.

(21) Appl. No.: 13/234,841

(22) Filed: Sep. 16, 2011

(65) Prior Publication Data

US 2012/0066188 A1 Mar. 15, 2012

Related U.S. Application Data

(63) Continuation of application No. PCT/JP2010/000167, filed on Jan. 14, 2010.

(30) Foreign Application Priority Data

Mar. 23, 2009 (JP) ................................ 2009-069686

(51) Int. Cl.

| H04N 5/917 | (2006.01) |
|---|---|
| H04N 5/92 | (2006.01) |
| G11B 27/00 | (2006.01) |
| H04N 5/93 | (2006.01) |
| H04N 5/76 | (2006.01) |
| G11B 20/00 | (2006.01) |
| G11B 20/10 | (2006.01) |
| H04N 5/89 | (2006.01) |
| H04N 5/84 | (2006.01) |

(52) U.S. Cl.
CPC .... *G11B 20/00007* (2013.01); *G11B 20/10527* (2013.01); *G11B 2020/00014* (2013.01); *G11B 2020/10666* (2013.01); *G11B 2020/10694* (2013.01); *G11B 2020/10703* (2013.01); *G11B 2020/10981* (2013.01); *G11B 2220/2545* (2013.01); *G11B 2220/2562* (2013.01); *G11B 2220/445* (2013.01)

USPC ........... 386/328; 386/326; 386/334; 386/279; 386/294

(58) Field of Classification Search
USPC .......................... 386/326, 328, 334, 279, 294
See application file for complete search history.

(56) References Cited

U.S. PATENT DOCUMENTS 5,165,103 A * 11/1992 Takeda et al. ................. 382/305
5,974,223 A * 10/1999 Uchide .......................... 386/295

(Continued)

FOREIGN PATENT DOCUMENTS

| JP | 2001-210007 | 8/2001 |
|---|---|---|
| JP | 2001-250322 | 9/2001 |

(Continued)

*Primary Examiner* — Daquan Zhao
(74) *Attorney, Agent, or Firm* — McDermott Will & Emery LLP

(57) ABSTRACT

A recording/reproducing method includes: reading a first uncompressed data from a first recording medium; reading the first uncompressed data from a buffer memory at a speed higher than a normal reproduction speed and compressing the read first uncompressed data to generate a compressed data; and recording the generated compressed data in a second recording medium; determining whether a predefined unit volume of compressed data is recorded in the second recording medium; and when it is determined that the predefined unit volume of compressed data is not yet recorded in the second recording medium, generating a second uncompressed data by reading the compressed data from the second recording medium at a speed higher than the normal reproduction speed and decompressing the read compressed data when it is determined that the predefined unit volume of compressed data is already recorded in the second recording medium.

19 Claims, 5 Drawing Sheets

(56) References Cited

U.S. PATENT DOCUMENTS

| | | | |
|---|---|---|---|
| 6,065,094 A * | 5/2000 | Akiyama | 711/112 |
| 6,741,797 B2 * | 5/2004 | Tozaki et al. | 386/222 |
| 6,950,605 B1 * | 9/2005 | Smolenski et al. | 386/334 |
| 7,493,024 B2 * | 2/2009 | Maetz et al. | 386/248 |
| 7,703,122 B2 * | 4/2010 | Kubo et al. | 725/151 |
| 7,720,358 B2 * | 5/2010 | Yokota et al. | 386/247 |
| 8,229,282 B2 * | 7/2012 | Kamiwada et al. | 386/292 |
| 2001/0028789 A1 * | 10/2001 | Uchide | 386/111 |
| 2003/0110513 A1 * | 6/2003 | Plourde et al. | 725/134 |
| 2003/0133542 A1 * | 7/2003 | Takahashi et al. | 379/68 |
| 2003/0161468 A1 * | 8/2003 | Iwagaki et al. | 380/201 |
| 2003/0215225 A1 * | 11/2003 | Kaku | 386/125 |
| 2004/0136288 A1 | 7/2004 | Gushima et al. | |
| 2004/0228608 A1 * | 11/2004 | Bak | 386/46 |
| 2005/0008346 A1 * | 1/2005 | Noguchi et al. | 386/125 |
| 2005/0232613 A1 * | 10/2005 | Iwamoto | 386/125 |
| 2007/0116028 A1 * | 5/2007 | Hsu | 370/412 |
| 2007/0147190 A1 * | 6/2007 | Mons | 369/30.03 |
| 2008/0031587 A1 * | 2/2008 | Chen et al. | 386/68 |
| 2010/0134655 A1 * | 6/2010 | Kuroiwa | 348/231.2 |

FOREIGN PATENT DOCUMENTS

| | | |
|---|---|---|
| JP | 2003-249008 | 9/2003 |
| JP | 2004-178789 | 6/2004 |
| JP | 2004-185224 | 7/2004 |
| JP | 2005-228391 | 8/2005 |

\* cited by examiner

F I G. 2
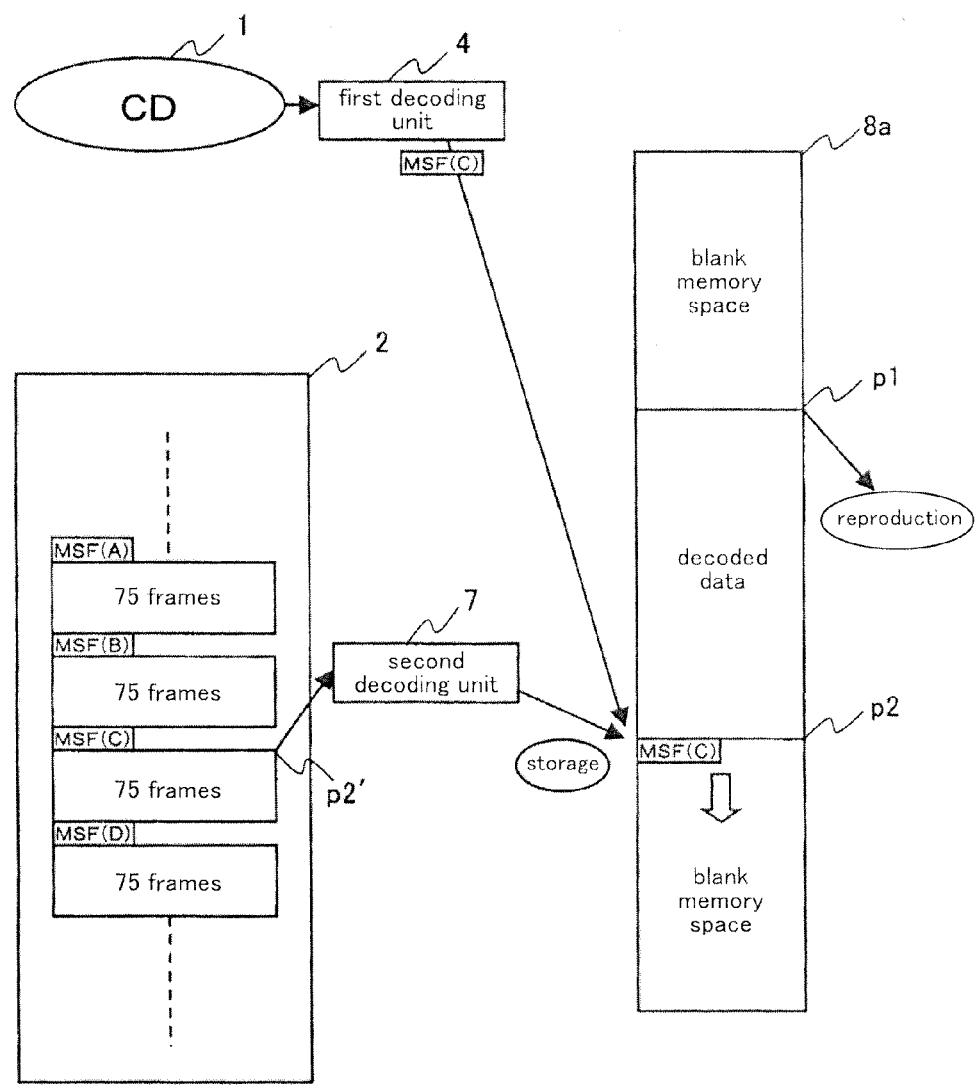

F I G. 4
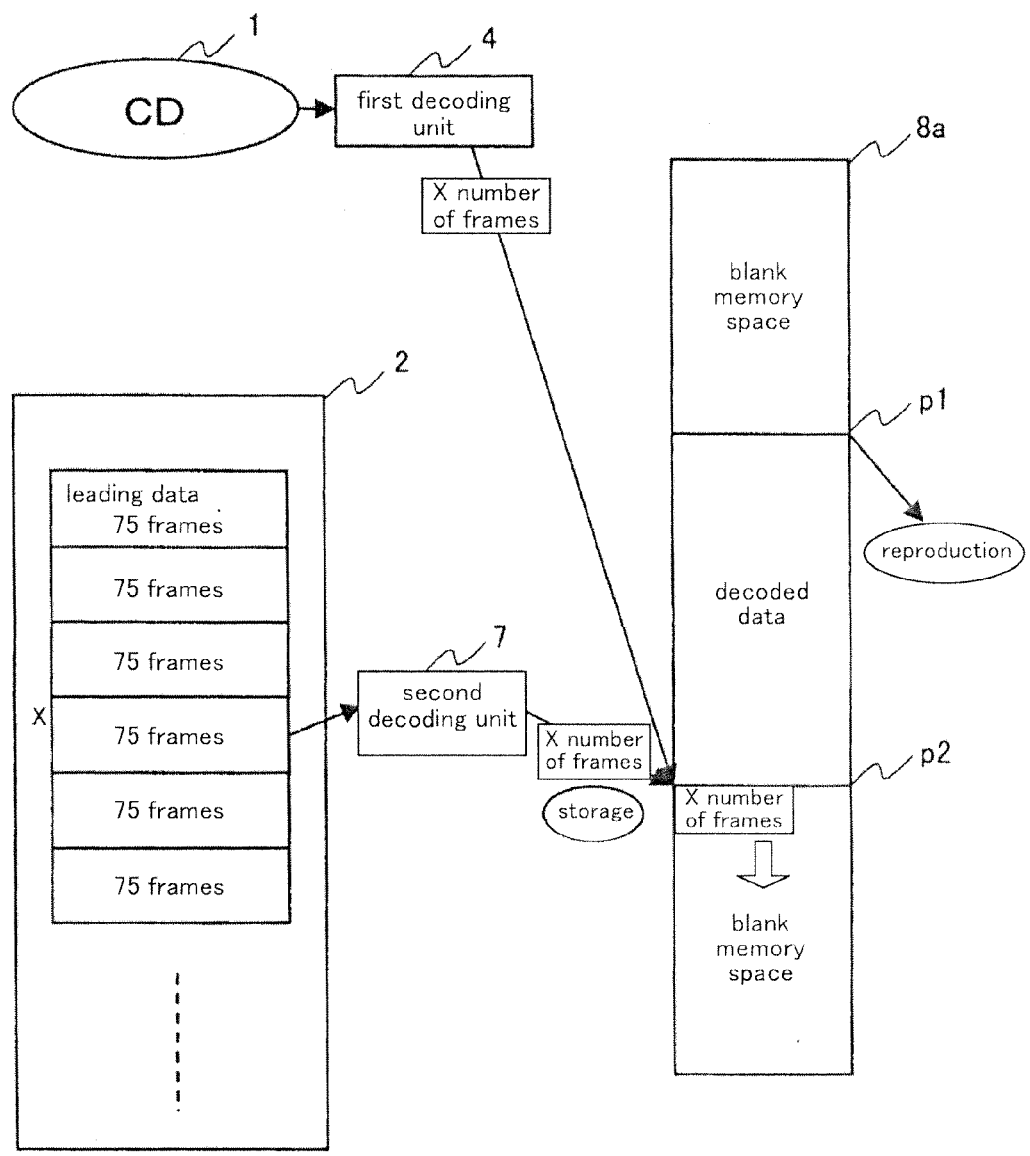

US 8,891,945 B2

RECORDING/REPRODUCING METHOD AND RECORDING/REPRODUCING DEVICE

CROSS REFERENCE TO RELATED APPLICATIONS

This application is continuation of PCT International Application No. PCT/JP2010/000167, filed on Jan. 14, 2010, which in turn claims the benefit of Japanese Application No. 2009-069686, filed on Mar. 23, 2009, the disclosures of which Applications are incorporated by reference herein.

FIELD OF THE INVENTION

The present invention relates to a recording/reproducing method and a recording/reproducing device used to compress uncompressed data recorded in a first removable recording medium such as CD (trademark name: compact disc) and record the compressed data in a second recording medium where data can be written and read faster than the first recording medium such as a hard disc (which is generally called "ripping"), more particularly to a technology for avoiding data discontinuity such as jumpiness while moderating restrictions on ejection timings of a plurality of first recording mediums when data is ripped in the plurality of first recording mediums from one medium to another.

BACKGROUND OF THE INVENTION

In the technical field of multimedia, various types of ripping systems are currently developed and introduced along with an ongoing increase of hard disc capacity and an increasingly improved efficiency in data compression technique. Describing the ripping, music data recorded in a removable medium such as music CD or DVD-Video, for example, is extracted from the medium and converted into any file format that can be processed in personal computers conventionally available, an example of which is MP3 (MPEG1 Audio Layer-3) format, so that the converted data is stored in a hard disc having a large storage capacity. The ripping technique is particularly often used to convert music data recorded in music CD into MP3 data.

An invention developed for compressing CD data and ripping the compressed data in a hard disc can rip data in a plurality of recording mediums while continuing to reproduce the data already ripped from the recording medium (for example, see the Patent Document 1).

Further, there is a dubbing system configured such that information data currently copied from CD into a hard disc can be immediately reproduced randomly in any order without waiting for the data copying to be completed, and the data copying is continuously performed in the background when a condition change occurs, for example, when the CD is ejected before the data copying finishes, or when the system is shut down (for example, see the Patent Document 2).

Also available a technology wherein all of data currently copied from CD into a hard disc data can be reproduced from the hard disc and compressed at the same time (for example, see the Patent Document 3).

PRIOR ART DOCUMENT

Patent Document

Patent Document 1: Unexamined Japanese Patent Applications Laid-Open No. 2005-228391

Patent Document 2: Unexamined Japanese Patent Applications Laid-Open No. 2003-249008

Patent Document 3: Japanese Patent No. 4135051

SUMMARY OF THE INVENTION

Problem to be Solved by the Invention

The conventionally available devices and methods, however, involve the unsolved technical problem that there are considerable restrictions on ejection timings of a plurality of CDs when data is ripped in the plurality of CDs from one CD to another in order to avoid data discontinuity such as jumpiness which may result in a poor work efficiency when data is ripped in multiple CDs.

According to the invention disclosed in the Patent Document 1, data of all tracks recorded on a CD are ripped in a hard disc, and the CD is then ejected after the music reproduction is muted to switch to the music reproduction from the hard disc. This technology, however, demands that the ripping of all tracks be completed, and the music reproduction be muted as prerequisites for ejecting the CD. Such restrictions result in a poor ripping efficiency in multiple CDs, and ripping all of tracks including any unwanted tracks.

According to the invention disclosed in the Patent Document 2 wherein the data is copied in the background, the data reproduction can continue when the CD is ejected before the data ripping finishes. However, the invention disclosed in the Patent Document 2 with no reference to data compression is not expected to simultaneously process a plurality of compressed data (generation and/or recording of compressed data).

The inventions disclosed in the Patent Documents 1 and 3 both have to copy the whole CD data once in the hard disc to generate the compressed data, therefore, need a large amount of time for all of the data to be ripped before the reproduction starts, resulting in a poor work efficiency. Another disadvantage is an additional storage capacity required in the hard disc to temporarily copy the data, which increases a cost burden.

The present invention was accomplished to solve these technical problems, and a main object thereof is to moderate restrictions on ejection timings of a plurality of first recording mediums, such as CDs, when data is ripped in the plurality of first recording mediums from one medium to another.

Means for Solving the Problem

A recording/reproducing method according to the present invention comprises:

a first step for reading a first uncompressed data from a first recording medium;

a second step for storing the first uncompressed data in a buffer memory;

a third step for reading the first uncompressed data from the buffer memory at a speed higher than a normal reproduction speed of the first uncompressed data, the third step further compressing the read first uncompressed data to generate a compressed data and recording the generated compressed data in a second recording medium;

a fourth step for determining whether a predefined unit volume of the compressed data is recorded in the second recording medium, and a fifth step for continuing the first step, the second step, and the third step when the fourth step determines that the predefined unit volume of the compressed data is not yet recorded in the second recording medium, the fifth step further generating a second uncompressed data by reading the compressed data from the second recording medium at a speed higher than the normal reproduction speed and decompressing the read compressed data in place of the first step, the second step, and the third step when the fourth step determines that the predefined unit volume of the compressed data is already recorded in the second recording medium, the fifth step then storing the generated second uncompressed data in the buffer memory.

A recording/reproducing device according to the present invention comprises:

a buffer memory functioning as a working buffer memory;

a reading unit configured to read an uncompressed data from a first recording medium;

a first decoding unit configured to generate a first decoded data by decoding the uncompressed data and storing the generated first decoded data in the buffer memory;

a compression recording unit configured to read the first decoded data from the buffer memory at a speed higher than a normal reproduction speed of the uncompressed data to generate a compressed data and record the generated compressed data in a second recording medium;

a decompression unit configured to read the compressed data from the second recording medium at a speed higher than the normal reproduction speed and decompress the read compressed data to generate a decompressed data;

a second decoding unit configured to generate a second decoded data by decoding the decompressed data and store the generated second decoded data in the buffer memory; and a unit-volume recording completion monitoring unit configured to monitor whether a predefined unit volume of the compressed data is recorded in the second recording medium to determine whether the second decoded data should be stored in the buffer memory in place of the first decoded data based on a monitoring result thereby obtained, wherein the unit-volume recording completion monitoring unit allows the first decoded data to be recorded in the buffer memory when it is determined that the predefined unit volume of the compressed data is not yet recorded in the second recording medium, and the unit-volume recording completion monitoring unit suspends the recording of the first decoded data outputted from the first decoding unit in the buffer memory and then allows the second decoded data to be recorded in the buffer memory when it is determined that the predefined unit volume of the compressed data is already recorded in the second recording medium.

Effect of the Invention

The present invention thus technically characterized can improve a ripping efficiency by largely moderating restrictions on ejection timings of a plurality of first recording mediums, such as CDs, when data is ripped in the plurality of first recording mediums from one medium to another. Other advantages are; data discontinuity such as jumpiness can be avoided regardless of how a buffering state changes, and only the predefined unit volume of data is ripped at a time. These technical advantages can reduce a storage capacity of the second recording medium, such as hard disc, necessary for the data ripping.

BRIEF DESCRIPTION OF THE DRAWINGS

FIG. 2 is a data switchover MSF management chart used to describe an operation of the recording/reproducing device according to the exemplary embodiment 1.

FIG. 4 is a data switchover successive management chart used to describe an operation of the recording/reproducing device according to the exemplary embodiment 2.

EXEMPLARY EMBODIMENTS FOR CARRYING OUT THE INVENTION

Figure 1:
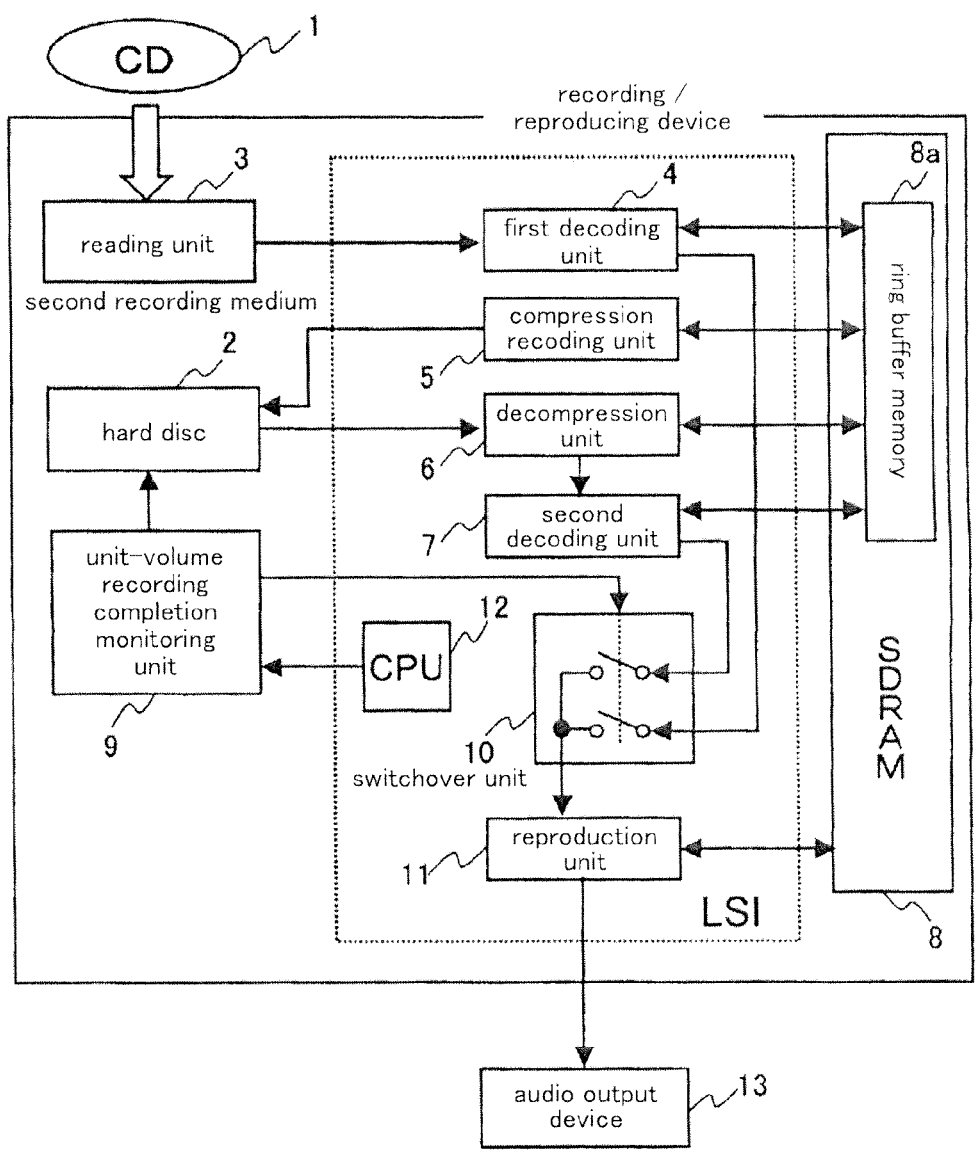
FIG. 1 is a block diagram illustrating a structure of a recording/reproducing device according to exemplary embodiments 1 and 2 of the present invention.

A recording/reproducing method according to the present invention reads a first uncompressed data from a first recording medium and temporarily stores the read first uncompressed data in a buffer memory. The recording/reproducing method then reads the first uncompressed data from the buffer memory and compresses the read first uncompressed data, and then records the resulting compressed data in a second recording medium (which is generally called "ripping").

The second recording medium, such as a hard disc, is accessible more speedily than the first recording medium such as CD. Therefore, the first uncompressed data can be read from the first recording medium faster than a normal reproduction speed of the first uncompressed data (for example, reproduction twice faster than normal). The first uncompressed data thus reproduced faster than normal is temporarily stored in the buffer memory and read from the buffer memory faster than the normal reproduction speed of the first uncompressed data. The read uncompressed data is then compressed so that the compressed data is generated. The generated compressed data is recorded in the second recording medium. Thus, the compressed data is generated and recorded in the second recording medium faster than normal, therefore, a volume of the first compressed data recorded in the second recording medium is larger than a reproduction volume of the first uncompressed data when normally reproduced. When a predefined unit volume (one track of music) of first uncompressed data is stored in the buffer memory, and reproduction of the predefined unit volume of first uncompressed data then starts, the predefined unit volume of first compressed data is already recorded in the second recording medium before all of the predefined unit volume of first uncompressed data is reproduced. The difference between the normal reproduction speed and the fast recording speed serves as a time margin.

Below is described an assumed case where as soon as all of the compressed data obtained by compressing one or a plurality of predefined unit volumes of first uncompressed data currently recorded in one first recording medium are recorded in the second recording medium (ripping), it is no longer necessary to rip any other first uncompressed data from the same first recording medium (it is unnecessary to rip all of the tracks). On account of the finding confirmed earlier, as far as the recording of the predefined unit volume of compressed data in the second recording medium is completed, there should be no problem in the data reproduction even after the first recording medium is ejected.

Therefore, the present invention performs the following processing steps. It is monitored whether the recording of the predefined unit volume of compressed data in the second recording medium is completed. The uncompressed data to be stored in the buffer memory to be produced is changed after determining that the recording of the predefined unit volume of compressed data in the second recording medium is completed, more specifically, a second uncompressed data generated by reading and decompressing the compressed data recorded in the second recording medium now starts to be stored in the buffer memory in place of the first uncompressed data so far stored in the buffer memory. Thus, the uncompressed data to be stored in the buffer memory to be reproduced, which is currently the first uncompressed data, is switched to the second uncompressed data obtained by decompressing the compressed data already ripped and stored in the second recording medium. After the uncompressed data to be stored in the buffer memory is thus changed, the first uncompressed data recorded in the first recording medium is no longer necessary, meaning that the first recording medium can be ejected.

The present invention may further take into consideration a data switchover position when the uncompressed data to be stored in the buffer memory is switched from one to the other. In a fifth step of the recording/reproducing method according to an aspect of the present invention, the compressed data is read from a data position of the compressed data recorded in the second recording medium corresponding to a storage position of the first uncompressed data in the buffer memory when the recording of the predefined unit volume of compressed data in the second recording medium is completed, the read compressed data is decompressed so that the second uncompressed data is generated, and the generated second uncompressed data is stored in the buffer memory to be continuous to the first compressed data. According to the aspect, continuity of the data stored in the buffer memory is ensured even after a source of supply of the uncompressed data is switched from first recording medium to the second recording medium.

An additional description is given to the storage position. For example, a position where the first uncompressed data is normally reproduced in the buffer memory is called a reproduction position p1, and a leading position of the storage positions where the first uncompressed data is stored in the buffer memory is called a storage leading-end position p2. The storage leading-end position p2 is located prior to the reproduction position p1 because data storage is conventionally performed faster than data reproduction. The priority of the storage leading-end position p2 to the reproduction position p1 is the time margin described earlier. It important to maintain data continuity when the data supply source, which is currently the first recording medium, is switched to the second recording medium. The compressed data is read from a data position of the compressed data in the second recording medium corresponding to a storage position of a first decoded data in the buffer memory when the recording of the predefined unit volume of compressed data in the second recording medium is completed, and the read compressed data is decompressed so that a second decoded data is generated.

Because the data supply source is thus changed after such a position adjustment is done, the data continuity is not lost. Therefore, when the reproduction position finally arrives at the switchover position with time and the reproduction is performed there or the reproduction is performed later on, such data discontinuity as jumpiness does not occur in the data reproduction. A technical advantage of the present invention is to very accurately perform such a position adjustment for the data source change when the data to be reproduced is stored in the buffer memory.

Though an ejection timing of the first recording medium arrives intermittently, its periodical cycle does not depend on a total data volume of the recording medium but depends on the predefined unit volume of data. Therefore, unlike the prior art, it is unnecessary to wait over an extensive period of time for all of the first uncompressed data (for example, all of the music tracks) to be compressed and recorded in the second recording medium before ejecting the first recording medium. As soon as the recording of one or a plurality of predefined units of compressed data in the second recording medium is completed, the first recording medium can be ejected to be replaced with another first recording medium for data ripping. As a result, the data ripping in a plurality of first recording mediums can be performed very efficiently.

Summarizing the description given so far, the recording/reproducing method according to the present invention switches the uncompressed data to be stored in the buffer memory from the first uncompressed data to the second compressed data to largely moderate restrictions on the ejection timing of the first recording medium, thereby ripping the data with a high efficiency. Another advantage of the method is to change the recording medium after the position adjustment, thereby maintaining the data continuity regardless of changing the uncompressed data to be buffered. In the data ripping in combination with synchronous reproduction, it is neither necessary to temporarily copy the uncompressed data in the second recording medium nor rip the entire data of the first recording medium. The data to be ripped is only the predefined unit volume of data, thereby requiring less data storage capacity in the second recording medium, such as a hard disc, used for the data ripping.

A recording/reproducing device according to the present invention decodes an uncompressed data read by a reading unit from a first recording medium using a first decoding unit to generate a first decoded data, and stores the generated first decoded data in a buffer memory. Then, the device reads the first decoded data from the buffer memory faster than a normal reproduction speed of the uncompressed data and compresses the read uncompressed data using a compression recording unit so that a compressed data is generated, and records the generated compressed data in a second recording medium. A unit-volume recording completion monitoring unit monitors a recording progress of the compressed data in the second recording medium, and waits for a predefined unit volume (for example, one track of music) of compressed data to be recorded therein. The reproduction of the first decoded data and the recording of the compressed data in the second recording medium continue until the recording of the predefined unit volume of compressed data is completed. While the reproduction and the recording are continuing, the first decoded data is stored in the buffer memory. A storage leading-end position of the first decoded data in the buffer memory is located prior to a reproduction position of the first decoded data stored in the buffer memory. Thus, a volume of the compressed data recorded in the second recording medium is larger than a volume of data reproduced from the buffer memory because the compressed data is recorded in the second recording medium faster than normal.

After determining that the recording of the predefined unit volume of compressed data in the second recording medium is not yet completed, the unit-volume recording completion monitoring unit allows the first decoded data to be recorded in the buffer memory. After determining that the recording of the predefined unit volume of compressed data in the second recording medium is completed, the unit-volume recording completion monitoring unit suspends the recording of the first decoded data outputted from the first decoding unit in the buffer memory but allows a second decoded data to be recorded in the buffer memory.

According to an aspect of the present invention, the recording/reproducing device further comprises a reproduction unit configured to analog-output the first decoded data or the second decoded data at the normal reproduction speed. When the unit-volume recording completion monitoring unit of the recording/reproducing device according to the aspect determines that the recording of the predefined unit volume of compressed data in the second recording medium is not yet completed, the reproduction unit reproduces the first decoded data at the normal reproduction speed. When the unit-volume recording completion monitoring unit determines that the recording of the predefined unit volume of compressed data in the second recording medium is completed, on the other hand, the reproduction unit reproduces the second decoded data at the normal reproduction speed.

To perform the processing steps described so far, the recording/reproducing device according to the present invention may further comprise a switchover unit configured to switch from one of the first decoded data and the second decoded data to the other and supply the selected decoded data to the reproduction unit. After determining that the recording of the predefined unit volume of compressed data in the second recording medium is not yet completed, the unit-volume recording completion monitoring unit outputs an instruction to switch to the first decoded data to the switchover unit. After determining that the recording of the predefined unit volume of compressed data in the second recording medium is completed, the unit-volume recording completion monitoring unit outputs an instruction to switch to the second decoded data to the switchover unit. The reproduction unit analog-outputs the first decoded data or the second decoded data outputted from the switchover unit.

After determining that the recording of the predefined unit volume of compressed data is completed, the unit-volume recording completion monitoring unit controls the switchover unit to switch to the second decoded data. Accordingly, a decompression unit decompresses the compressed data recorded in the second recording medium to generate a decompressed data, and a second decoding unit decodes the decompressed data to generate the second decoded data. The switchover unit outputs the second decoded data to the reproduction unit. The reproduction unit analog-outputs the second decoded data. The buffer memory is used as a working buffer memory where the compressed data is decompressed and decoded.

When the switchover unit switches the decoded data to be supplied to the reproduction unit from the first decoded data to the second decoded data, the compressed data recorded in the second recording medium starts to be read and decompressed so that the second decoded data is generated and stored in the buffer memory in place of decoding the uncompressed data read from the first recording medium so that the first decoded data is generated and stored in the buffer memory. After the processing change, the first recording medium can be ejected because the uncompressed data recorded in the first recording medium is no longer necessary.

The decompression unit reads the compressed data from a data position of the compressed data in the second recording medium corresponding to a storage position of the first decoded data in the buffer memory when the recording of the predefined unit volume of compressed data in the second recording medium is completed, and decompresses the read compressed data to generate the second decoded data. The second decoding unit stores the second decoded data in the buffer memory so that the second decoded data is continuous to the first decoded data. Then, continuity of the decoded data stored in the buffer memory is ensured even after the data supply source is switched from the first recording medium to the second recording medium.

As described so far, the recording/reproducing device according to the present invention smoothly and swiftly switches from the processing that the uncompressed data stored in the first recording medium is buffered to the processing that the compressed data stored in the second recording medium is buffered, thereby largely moderating restrictions on the ejection timing of the first recording medium. The recording/reproducing device thus characterized can perform the data ripping with a high efficiency and avoid such data discontinuity as jumpiness notwithstanding the buffering change. In the data ripping combined with synchronous reproduction, it is neither necessary to temporarily copy the uncompressed data in the second recording medium nor rip the entire data of the first recording medium. The data to be ripped is only the predefined unit volume of data, thereby requiring less data storage capacity in the second recording medium, such as a hard disc, used for the data ripping.

In the recording/reproducing method according to another aspect of the present invention, a positional information which enables the data position to be identified is appended to the compressed data and the resulting compressed data is recorded in the second recording medium in a third step, and the data position is identified based on the positional information in the fifth step.

In the recording/reproducing device according to another aspect of the present invention, the compression recording unit appends a positional information which enables the data position to be identified to the compressed data and records the resulting compressed data in the second recording medium, and the decompression unit identifies the data position based on the positional information. An example of the positional information which enables the data position to be identified is a physical address represented by MSF (Minute Second Frame) in the case where the first recording medium is CD.

According to the aspect, the compressed data having the same positional information as the storage leading-end position of the first uncompressed data is preferably searched in the second recording medium so that the data reproduction starts with the compressed data. The position adjustment for the data source change can reliably prevent the occurrence of such data discontinuity as jumpiness although the data supply source is changed.

In the recording/reproducing method according to still another aspect of the present invention, number of buffering frames is counted when the first uncompressed data is read from the first recording medium so that a first count value is generated in a first step, the compressed data is read from the second recording medium, starting with a leading data thereof, and number of frames of the read compressed data is counted so that a second count value is generated in a fourth step, and the storage position is identified based on the first count value when the recording of the predefined unit volume of compressed data in the second recording medium is completed, and the first count value and the second value are compared with each other so that the data position is identified based on a comparison result thereby obtained in the fourth step.

In the recording/reproducing device according to still another aspect of the present invention, the reading unit counts number of buffering frames when reading the uncompressed data from the first recording medium to thereby generate a first count value, the decompression unit reads the compressed data from the second recording medium, starting with a leading data thereof, and counts number of frames in the read compressed data to thereby generate a second count value, and the decompression unit further identifies the storage position based on the first count value when the recording of the predefined unit volume of compressed data in the second recording medium is completed, and compares the first count value and the second value with each other so that the data position is identified based on a comparison result thereby obtained.

According to the aspect, the compressed data is read per frame and the numbers of frames are compared repeatedly until the respective numbers of frames (first and second count values) are equal to each other. When the numbers of frames equal to each other, the reproduction starts with the compressed data of the relevant frames. Then, the position adjustment for the data source change can be very accurate. Such an accurate position adjustment for the data source change can reliably prevent the occurrence of data discontinuity, for example, jumpiness although the data supply source is changed.

The buffer memory provided in the recording/reproducing device according to the present invention is preferably a ring buffer so that a required storage capacity of the buffer memory can be reduced.

A typical example of the first recording medium according to the present invention is an optical disc (music CD or DVD-Video), and a typical example of the second recording medium according to the present invention is a hard disc.

Hereinafter, exemplary embodiments of the recording/reproducing device according to the present invention are described in detail referring to the drawings.

Exemplary Embodiment 1

FIG. 1 is a block diagram illustrating a structure of a recording/reproducing device according to an exemplary embodiment 1 of the present invention.

The recording/reproducing device is configured to read audio data from a CD (compact disc) 1 and compresses the read audio data into MP3 (MPEG Audio Layer-3) data, and then writes the MP3 data in a hard disc (HD) 2. The CD 1 is an optical disc which is an example of the replaceable first recording medium, in which uncompressed data is stored. The uncompressed data used in the present invention is an assembly of n (n is a natural number) number of content data including audio data or video data. The hard disc 2 is an example of the fast-recordable/reproducible second recording medium. The music data is an example of the first uncompressed data, and the MP3 data is an example of the compressed data.

The recording/reproducing device comprises a reading unit 3, a first decoding unit 4, a compression recording unit 5, a decompression unit 6, a second decoding unit 7, a SDRAM (Synchronous Dynamic Random Access Memory) 8, a unit-volume recording completion monitoring unit 9, a switchover unit 10, a reproduction unit 11, and a CPU 12.

The SDRAM (Synchronous Dynamic Random Access Memory) 8 functions as a working memory shared by the first decoding unit 4, compression recording unit 5, decompression unit 6, and second decoding unit 7. The reading unit 3 reads from the CD 1 the audio data recorded therein. The first decoding unit 4 decodes the audio data read by the reading unit 3 from the CD 1 and temporarily records the resulting decoded data in the SDRAM 8. Hereinafter, the decoded audio data is called a first decoded data.

The compression recording unit 5 compresses the first decoded data temporarily recorded in the SDRAM 8 to generate MP3 data, and records the generated MP3 data in the hard disc 2. The MP3 data is an example of the compressed data. The compressed data according to the present invention is not necessarily limited to the MP3 data, and may be a different form of compressed data. The decompression unit 6 reads the MP3 data recorded in the hard disc 2 faster than a speed at which the audio data of the CD 1 is normally reproduced (hereinafter, called normal reproduction speed) and decompresses (demodulates) the read MP3 data. The second decoding unit 7 decodes the decompressed data obtained by the decompression unit 6 to generate a second decoded data. The second decoded data is an example of the second uncompressed data. The unit-volume recording completion monitoring unit 9 monitors whether a predefined unit volume (one track o music) of compressed data is already recorded in the hard disc 2, and outputs a switchover signal after detecting that the recording of such a volume of compressed data is completed. The predefined unit volume is equal to a volume of one data or m number of data in all of content data stored in the CD 1. The m is a natural number equal to or smaller than n number of content data in total.

The switchover unit 10 switches to and from the first decoded data outputted from the first decoding unit 4 and the second decoded data outputted from the second decoding unit 7. The reproduction unit 11 analog-outputs the decoded data supplied by way of the switchover unit 10 (first or second decoded data). The CPU 12 is in charge of an overall control of the whole system. The decoded data analog-outputted from the reproduction unit 11 is outputted in the form of sound and/or voice by an audio output device 13.

The SDRAM 8a includes a ring buffer memory 8a. The ring buffer memory 8a is used to temporarily store the decoded data therein to generate the sound and/or voice. The CPU 12 is configured to control the first decoding unit 4, compression recording unit 5, decompression unit 6, second decoding unit 7, SDRAM 8, unit-volume recording completion monitoring unit 9, and reproduction unit 11. The data processes, such as temporary data storage, decoding, compression, and decompression, are a series of data processing steps in which the SDRAM 12 is used.

An operation of the recording/reproducing device thus structurally characterized is described below. FIG. 2 is a data switchover MSF management chart used to describe an operation of the recording/reproducing device according to the exemplary embodiment 1. The MSF is the abbreviation of Minute Second Frame, which is a physical address which chronologically defines a data position of video/audio data. The MSF is used as, for example, a time code which defines each frame in video data and audio data.

The audio data is read from the CD1 by the reading unit 3. The audio data read from the CD 1 is hereinafter called audio data (CD). Though the audio data (CD) is preferably read faster than the normal reproduction speed of the CD 1 in order to increase a processing speed, the audio data (CD) may be read at the normal reproduction speed. The read audio data (CD) is stored in the ring buffer memory 8a by way of the first decoding unit 4. The audio data (CD) stored then in the ring buffer memory 8a is not yet decoded. After a certain volume of the audio data (CD) is stored in the ring buffer memory 8a, the audio data (CD) is read by the first decoding unit 4. The first decoding unit 4 decodes the audio data (CD) to thereby generate the first decoded data. The first decoded data is temporarily stored in the ring buffer memory 8a and then read therefrom at the normal reproduction speed of the audio data (CD). The read first decoded data is then outputted to the reproduction unit 11 by way of the switchover unit 10. The reproduction unit 11 converts the inputted first decoded data into an analog signal and outputs the analog signal to the audio output device 13.

In parallel with the processing steps described so far, the compression recording unit 5 reads the first decoded data from the ring buffer memory 8a faster than the normal reproduction speed and compresses the read data into codes to generate the MP3 data. The compression recording unit 5 rips the generated MP3 data in the hard disc at a high speed. During the ripping, an index is appended to the MP3 data at every 75 frames. Accordingly, a larger volume of MP3 data than the first decoded data currently reproduced (MP3 data is also generated from the first decoded data) can be recorded in the hard disc 2 before the reproduction is over. Referring to FIG. 2, p1 denotes a reproduction position of the first decoded data currently reproduced, and p2 denotes a storage leading-end position where the first decoded data is stored in the ring buffer memory 8a. The MP3 data is generated and stored in the hard disc 2 faster than the normal reproduction speeds of the audio data (CD) and the first uncompressed data. Therefore, the storage leading-end position p2 always transits prior to the reproduction position p1. Then, the MSF (Minute Second Frame) is appended to the MP3 data as the index per 75 frames.

To record the MP3 data, which is the compressed data, in the hard disc 2, the unit-volume recording completion monitoring unit 9 determines whether the MP3 data for one track (predefined unit volume) is already recorded in the hard disc 2. After confirming that the MP3 data for one track is already recorded, the unit-volume recording completion monitoring unit 9 renders the switchover signal active and outputs the resulting signal to the switchover unit 10. The switchover unit 10 receives the switchover signal (active) and switches a source of supply of the decoded data to be supplied to the reproduction unit 11 from the first decoding unit 4 to the second decoding unit 7. In response to the data source change, the decompression unit 6 and the second decoding unit 7 are turned on, and the MP3 data is read from the hard disc 2 faster than the normal reproduction speed of the audio data (CD) and outputted to the decompression unit 6. The decompression unit 6 decompresses the inputted MP3 data using the SDRAM 8 to thereby generate the decompressed data, and outputs the decompressed data to the second decoding unit 7. The second decoding unit 7 decodes the inputted decompressed data to thereby generate the second decoded data. The second decoding unit 7 temporarily stores the generated second decoded data in the ring buffer memory 8a and then reads the second decoded data from the ring buffer memory 8a at the normal reproduction speed, and thereafter transmits the read second decoded data to the reproduction unit 11 by way of the switchover unit 10. The reproduction unit 11 analog-converts the supplied second decoded data (second uncompressed data) to obtain an analog signal, and then outputs the analog signal to the audio output device 13.

For example, a position where a leading data is stored in the first decoded data stored in the ring buffer memory 8a is the storage leading-end position p2, and the first decoded data stored at an address position next to the storage leading-end position p2 is called an MSF (C) decoded data, in which case the MP3 data is already recorded at a position p2' corresponding to the position of the MSF (C) decoded data and a position behind the position p2' (temporally later). Hereinafter, the MP3 data recorded at the position p2' of the hard disc 2 corresponding to the storage leading-end position p2 of the ring buffer memory 8a is called MSF (C) MP3 data. An MSF index search is performed in the hard disc 2 so that a series of MP3 data which start with the MSF (C) MP3 data are read and decompressed by the decompression unit 6, and the decompressed data is supplied to the second decoding unit 7. The second decoding unit 7 demodulates the supplied decompressed data to thereby generate the second decoded data. The second decoding unit 7 records the generated second decoded data in the ring buffer memory 8a. As a result, the decoded data recorded in the ring buffer memory 8a at address positions after the storage leading-end position p2 is switched from the first decoded data outputted from the first decoding unit 4 to the second decoded data outputted from the second decoding unit 4.

An example is given below, in which the compressed MP3 data is ripped in the hard disc 2 per 75 frames until the ripping of the MP3 data for one track (predefined unit volume) is completed, and the first decoded data, which is the CD-originated uncompressed audio data, is stored at positions up to the storage leasing position p2 in the ring buffer memory 8a. In the given example, all of the decoded data stored at any positions between the storage leading-end position p2 and the reproduction position p1 are the first decoded data. When the first decoding unit 4 decodes the audio data (CD) to thereby generate the first decoded data, the first decoding unit 4 appends the MSF (positional information which enables the reproduction position to be identified; physical address) to the first decoded data. The decompression unit 6 checks the MSF at the storage leading-end position p2 (more precisely, position next to the storage leading-end position p2) when reading the MP3 data from the hard disc 2. The storage leading-end position p2 checked then corresponds to the storage position of the first decoded data in the buffer memory 8 when the recording of the predefined unit volume of MP3 data in the hard disc 2 is completed.

The MSF checked then is hereinafter called MSF (C). The MSF (C) thus checked is used as a positional information indicating the data position of a leading frame when the MP3 data is read from the hard disc 2. The CPU 12 or the unit-volume recording completion monitoring unit 9 searches a recording progress in the hard disc 2 based on the MSF (C) to start the read of the MP3 data with a frame relevant to the MSF (C). The second decoded data is generated from the read MP3 data, and the generated second decoded data is stored in the ring buffer memory 8a to be continuous to the first decoded data at the storage leading-end position p2.

When the switchover unit 10 switches the source of supply of the decoded data to be supplied to the reproduction unit 11 from the first decoding unit 4 to the second decoding unit 7, the first decoded data starts to be stored in the ring buffer memory 8a in place of storing the second decoded data in the ring buffer memory 8a. After the source of supply is thus changed, the decoded data obtained from the CD 1 to be stored in the ring buffer memory 8a, which is currently the first decoded data, is changed to the second decoded data.

Accordingly, the decoded data thereafter read to be stored in the ring buffer memory 8a is the second decoded data, making it unnecessary to read the audio data (CD). Therefore, the second decoded data (which is also obtained from the CD 1) continues to be read after the CD 1 is ejected. Then, the CD 1 can be thereafter ejected anytime, and the data ripping can start with the next CD 1 after the current CD 1 is ejected. As a result, the ripping only needs an amount of time less than an amount of time necessary for reading the data from the CDs, thereby improving a work efficiency when the data is ripped from multiple CDs.

When the decoded data is written in the ring buffer memory 8a with the source of data supply thus changed from one medium to the other and the decoded data stored in the ring buffer memory 8a is read and then reproduced, it is important to ensure continuity of the data reproduction before and after a point of change of the data supply source. The present exemplary embodiment uses the MSF (C) to accurately adjust the data position when the source of data supply which supplies the data to the ring buffer memory 8*a* is changed from the CD 1 (audio data (C)) to the hard disc 2 (MP3 data). Therefore, when the reproduction position p1 arrives at the point of change of the data supply source (storage leading-end position p2 in FIG. 2) when the decoded data in the ring buffer memory 8*a* is reproduced, continuity of the data reproduction is ensured with no such data discontinuity as jumpiness.

Figure 3:
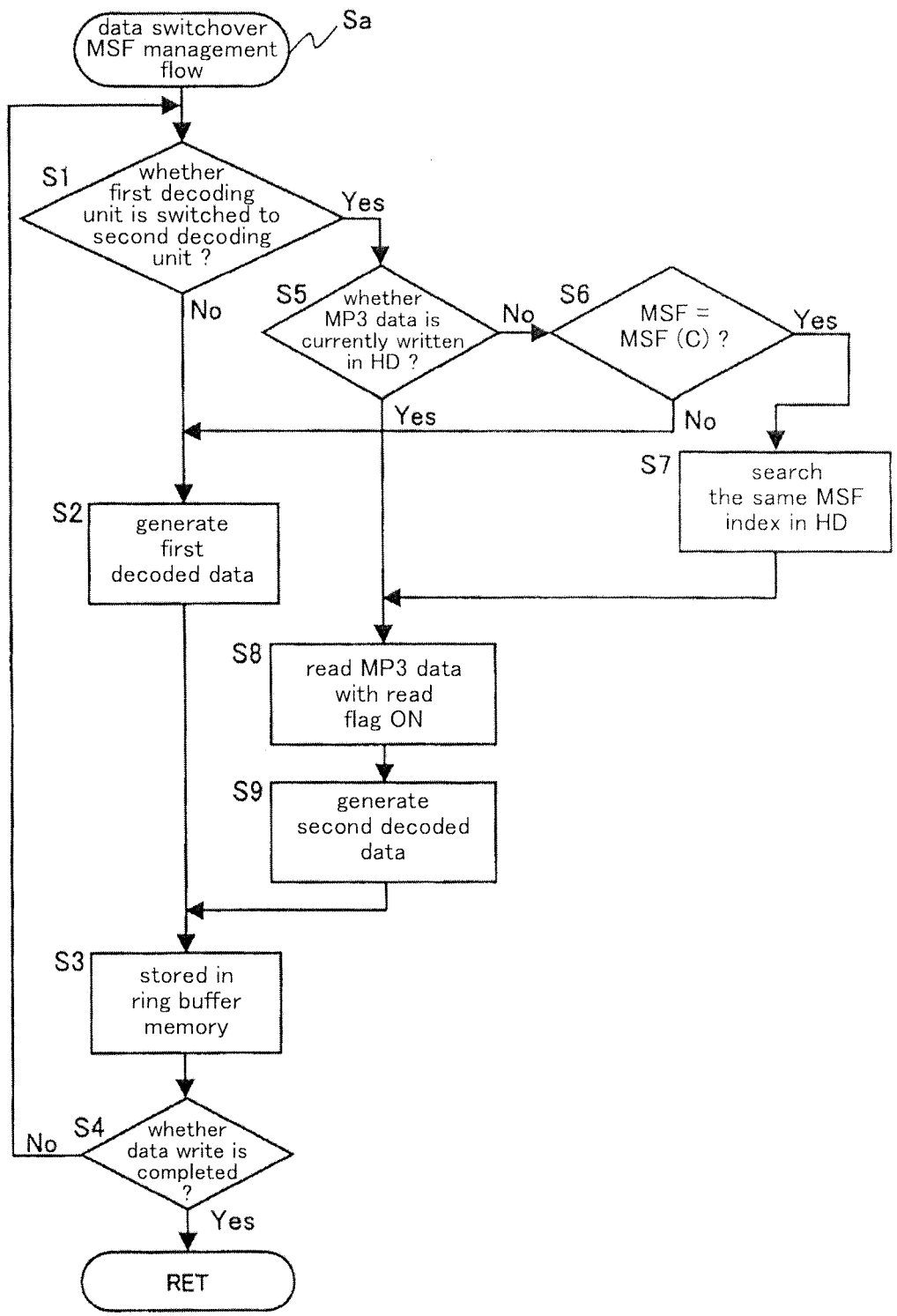
FIG. 3 is a flow chart used to describe the operation of the recording/reproducing device according to the exemplary embodiment 1.

Next, an operation when the source of data supply of the decoded data to be supplied to the ring buffer memory 8*a* is changed from the CD 1 to the hard disc 2 is described in detail referring to a flow chart illustrated in FIG. 3. The operation is called a data switchover MSF management flow Sa of the ring buffer memory 8*a*.

As a first step in the data switchover MSF management flow Sa, it is determined in Step S1 whether an instruction to switch the first decoding unit 4 to the second decoding unit 7 is issued. Whether the switchover instruction is issued is determined by confirming whether the switchover signal from the unit-volume recording completion monitoring unit 9 is active. The flow proceeds to Step S2 after determining that the switchover instruction was not issued, while proceeding to Step S5 after determining that the switchover instruction was issued.

In Step S2, the first decoding unit 4 reads the audio data (CD) from the CD 1 and then decodes the read audio data (CD) using the buffer memory 8 to thereby generate the first decoded data. In Step S3, the first decoded data outputted from the first decoding unit 4 is stored in the ring buffer memory 8*a*. In Step S4, it is determined whether the MP3 data for one track is already written in the hard disc 2. The flow returns to Step S1 after determining in Step S4 that it is necessary to continue to write the first decoded data in the ring buffer memory 8*a* because the MP3 data for one track is not yet written in the hard disc 2.

In Step S5, it is determined whether the MP3 data is currently read from the hard disc 2. The flow proceeds to Step S6 when Step S5 determines that the MP3 data is not currently read, while proceeding to Step S8 when Step S5 determines that the MP3 data is currently read. Because the MP3 data is not yet read in an initial stage after the processing flow starts, the flow proceeds to Step S6.

In Step S6, it is determined whether the MSF of the first decoded data outputted from the first decoding unit 4 and stored in the ring buffer memory 8*a* is the MSF (C). When Step S6 determines that the current MSF is not the MSF (C), the flow proceeds to Step S2 because it is presently not possible to change the decoded data. When Step S6 determines that the current MSF is the MSF (C), the flow proceeds to Step S7 because the decoded data switchover is possible.

In Step S2, the processing flow continues without changing the decoded data. In Step S7, the MP3 data recorded in the hard disc 2 is index-searched so that the data position of the MP3 data in the hard disc 2 is identified. Then, the flow proceeds to Step S8. In Step S8, an MP3 data reading flag in the hard disc 2 is flipped ON so that the MP3 data is read from the hard disc 2. The read of the MP3 data starts at a frame position of the data position p2' in the hard disc 2 corresponding to the storage leading-end position p2 (MSF (C)) in the ring buffer memory 8*a*. The MP3 data reading flag is initially OFF.

In Step S9, the MP3 data read from the hard disc 2 is decompressed by the decompression unit 6, and the decompressed data is decoded by the second decoding unit 7. Then, the flow proceeds to Step S3. In Step S3, the second decoded data outputted from the second decoding unit 7 is stored in the ring buffer memory 8*a*. Then, the flow proceeds to Step S4, and the hard disc 2 is searched based on the MSF (C) so that the MP3 data is read therefrom. Therefore, the second decoded data originated from the MP3 data is stored in the ring buffer memory 8*a* to be accurately continuous to the first decoded data originated from the audio data (CD).

In Step S4, it is determined whether the MP3 data for one track is already written in the hard disc 2. When Step S4 determines that the data write should continue because the MP3 data for one track is not yet written in the hard disc 2, the flow returns to Step S1.

The processing of Step S1 determines that the source of data supply of the decoded data is already switched to the second decoding unit 7, and the flow proceeds to Step S5. In Step S8, it is determined whether the MP3 data is currently read from the hard disc 2. The Step S8 is determined by confirming whether the MP3 data reading flag is ON. The processing of Step S8 determines that the MP3 data is currently read from the hard disc 2. Therefore, Steps S9, S3, S4, S1, S5, and S8 are cyclically carried out to continuously read the MP3 data from the hard disc 2. Then, the second decoded data is generated by the second decoding unit 7 based on the read MP3 data, and the generated second decoded data is stored in the ring buffer memory 8*a*. Therefore, the CD 1 can be ejected anytime (including during the data reproduction) after the cycle of Steps S9, S3, S4, S1, S5, and S8 started, meaning that there is no data discontinuity (for example, jumpiness) when the CD 1 is ejected. Therefore, a CD2 is loaded after the CD 1 is ejected so that the processing steps described so far are similarly carried out.

Whenever it is requested to reproduce any arbitrarily one of a plurality of MP3 data stored in the hard disc 2 during the ripping, the requested MP3 data can be reproduced.

Exemplary Embodiment 2

A recording/reproducing device according to an exemplary embodiment 2 of the present invention is configured to perform the position adjustment between the first decoded data and the second decoded data by comparing numbers of frames of the respective data when the decoded data to be stored in the ring buffer memory 8*a* is switched from the first decoded data to the second decoded data. The recording/reproducing device according to the present exemplary embodiment has a structure similar to that of the exemplary embodiment 1 illustrated in FIG. 1.

FIG. 4 is a data switchover successive management chart used to describe an operation of the recording/reproducing device according to the exemplary embodiment 2. Though the exemplary embodiment 1 identifies the position next to the storage leading-end position p2 based on the MSF (MSF (C)) illustrated in FIG. 2), the present exemplary embodiment identifies the position using frames (X number of frames illustrated in FIG. 4). Any other technical characteristics are similar to the exemplary embodiment 1 (FIG. 2). Hereinafter, the decoded data at the position next to the storage leading-end position p2 in the ring buffer memory 8*a* is called X-frame decoded data. When the first decoded data is buffered in the ring buffer memory 8*a*, the first decoding unit 4 counts number of frames in the first decoded data to be buffered. A value of the counted frames to be buffered in the first decoded data is called a first count value. The first decoding unit 4 transmits the obtained count value to the unit-volume recording completion monitoring unit 9.

When the MP3 data is read from the hard disc 2 according to the present exemplary embodiment, the read of MP3 data starts with its leading data (first frame) in a manner different to the exemplary embodiment 1. The number of frames of the MP3 data thus read is counted by the unit-volume recording completion monitoring unit 9. A value of the counted frames in the MP3 data is called a second count value.

The unit-volume recording completion monitoring unit 9 compares the first count value and the second count value with each other. When a comparison result shows that the count values are not equal to each other, it continues to read the MP3 data from the hard disc 2, count the second value, and fetch the first count value so that the MP3 data of the next frame is read from the hard disc 2. Further, the unit-volume recording completion monitoring unit 9 fetches again the first count value and continues to count the second count value. After the counting of the second count value and the refetch of the first count value are over, the unit-volume recording completion monitoring unit 9 determines again whether the first count value and the second count value are equal to each other. The read of the MP3 data per frame and the comparison of the first and second count values are repeated until the two count values equal to each other. When the two count values finally equal to each other, the reproduction, decompression, and decoding of the MP3 data start with the frame where the two count values equal so that the second decoded data is generated. Then, the generated second decoded data is stored in the ring buffer memory 8a.

As described so far, the exemplary embodiment 2 performs the position adjustment when the first decoded data is switched to the second decoded data based on the frames, making the position adjustment very accurate. As a result, discontinuity of the data reproduction (such as jumpiness) can be surely prevented from happening although the source of data supply of the decoded data is changed.

Figure 5:
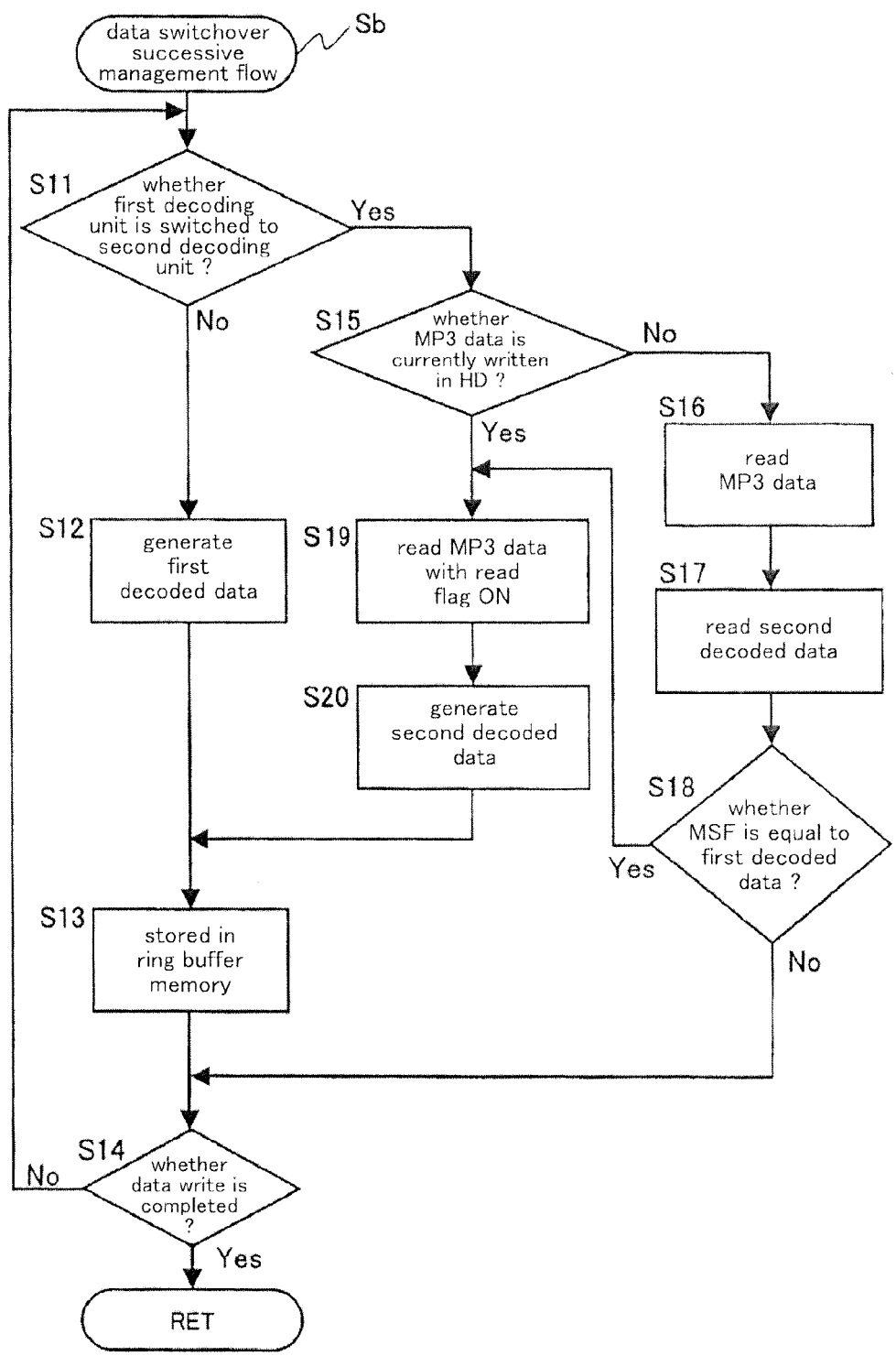
FIG. 5 is a flow chart used to describe the operation of the recording/reproducing device according to the exemplary embodiment 2.

An operation when the source of data supply of the decoded data to be stored in the ring buffer memory 8a is changed from the CD 1 to the hard disc 2 is described in detail referring to a flow chart illustrated in FIG. 5. The operation is called a data switchover successive management flow Sb of the ring buffer memory 8a.

Steps S11-S15 will not be described because they execute the same processing step as Steps S1-S5 according to the exemplary embodiment 1 illustrated in FIG. 3.

According to the present exemplary embodiment, Step S16 subsequent to Step S15 reads the MP3 data from the hard disc 2, starting with its leading data. In Step S17, the read MP3 data is decoded by the second decoding unit 7 so that the second decoded data is generated. In Step S18, it is determined whether number of frames of the second decoded data (second count value) and number of frames X of the first decoded data (first count value) are equal to each other.

When Step S17 determines that number of frames of the second decoded data (second count value) and number of frames X of the first decoded data (first count value) are not equal to each other, the flow moves on in the order of Steps S14→S11→S15→S16. In Step S16, the MP3 data of the next frame is read. In Step S17, the MP3 data is decoded by the second decoding unit 7 so that the second decoded data is generated. Thereafter, these processing steps are repeatedly carried out. When it is determined in Step S18 that the first count value and the second count value are equal during the repeated processing steps (number of frames of the read MP3 data are equal to X number of frames), the flow departs from the repetitive processing steps, and proceeds to Step S19.

In Step S19, the MP3 data reading flag in the hard disc 2 is flipped ON, and the MP3 data is read from the hard disc 2. The read of the MP3 data starts at the frame position of the data position p2' in the hard disc 2 corresponding to the frame position of the storage leading-end position p2 in the ring buffer memory 8a. Because the position of the MP3 data to be read from the hard disc 2 is identified through the frame search, the second decoded data can be stored in the ring buffer memory 8a to be accurately continuous to the first decoded data. The MP3 data reading flag is initially OFF.

In Step S20, the MP3 data read from the hard disc 2 is decompressed by the decompression unit 6, and the decompressed data is decoded by the second decoding unit 7. Then, the flow returns to Step S13.

The rest of the processing steps, which are similar to the exemplary embodiment 1, will not be described.

INDUSTRIAL APPLICABILITY

The present invention can largely moderate restrictions on ejection timings of a plurality of recording mediums such as CDs when data is ripped from one of the recording mediums to the other, thereby improving a ripping efficiency.

Although the source of data supply of data to be buffered is changed, such data discontinuity as jumpiness can be avoided.

A data capacity of the second recording medium required for the ripping can be reduced.

Therefore, the present invention provides a very advantageous technology which improves a ripping speed. All of data to be stored in a hard disc are compressed data, which contributes to reduction of resources. The present invention is favorably applied to vehicle-mounted devices, and various optical disc recorders.

DESCRIPTION OF REFERENCE SYMBOLS

1 CD (first recording medium)
2 hard disc (second recording medium)
3 reading unit
4 first decoding unit
5 compression recording unit
6 decompression unit
7 second decoding unit
8 SDRAM
8a ring buffer memory
9 unit-volume recording completion monitoring unit
10 switchover unit
11 reproduction unit
12 CPU
13 audio output device
p1 current reproduction position
p2 storage leading-end position

What is claimed is:

1. A recording/reproducing method, comprising:
   a first step for reading a first uncompressed data from a first recording medium;
   a second step for storing the first uncompressed data in a buffer memory;
   a third step for reading the first uncompressed data from the buffer memory at a speed higher than a normal reproduction speed of the first uncompressed data, the third step further compressing the read first uncompressed data to generate a compressed data and recording the generated compressed data in a second recording medium;
   a fourth step for determining whether a predefined unit volume of the compressed data is recorded in the second recording medium, and
   a fifth step for continuing the first step, the second step, and the third step when the fourth step determines that the predefined unit volume of the compressed data is not yet recorded in the second recording medium, the fifth step further generating a second uncompressed data by reading the compressed data from the second recording medium at a speed higher than the normal reproduction speed and decompressing the read compressed data in place of the first step, the second step, and the third step when the fourth step determines that the predefined unit volume of the compressed data is already recorded in the second recording medium, the fifth step then storing the generated second uncompressed data in the buffer memory.

2. The recording/reproducing method as claimed in claim 1, wherein
the first uncompressed data is decoded to generate a first decoded data, and the generated first decoded data is stored in the buffer memory in the second step,
the first decoded data is read from the buffer memory at a speed higher than the normal reproduction speed and compressed to generate the compressed data in the third step, and
the compressed data is read from the second recording medium at a speed higher than the normal reproduction speed and then decompressed and decoded so that a second decoded data is generated in place of the first step, the second step, and the third step when the fourth step determines that the recording of the predefined unit volume of the compressed data in the second recording medium is completed, and the generated second decoded data is stored in the buffer memory as the second uncompressed data in the fifth step.

3. The recording/reproducing method as claimed in claim 1, wherein
the first uncompressed data is read from the first recording medium at a speed higher than the normal reproduction speed in the first step.

4. The recording/reproducing method as claimed in claim 1, further comprising a sixth step for reading the first uncompressed data from the buffer memory at the normal reproduction speed and reproducing the read first uncompressed data when the fourth step determines that the recording of the predefined unit volume of the compressed data in the second recording medium is not yet completed, the sixth step further reading the second uncompressed data from the buffer memory at the normal reproduction speed and reproducing the read second uncompressed data when the fourth step determines that the recording of the predefined unit volume of the compressed data in the second recording medium is completed.

5. The recording/reproducing method as claimed in claim 1, wherein
the compressed data is read from a data position of the compressed data recorded in the second recording medium corresponding to a storage position of the first uncompressed data in the buffer memory when the recording of the predefined unit volume of the compressed data in the second recording medium is completed, the read compressed data is decompressed so that the second uncompressed data is generated, and the generated second uncompressed data is stored in the buffer memory to be continuous to the data position of the first compressed data in the fifth step.

6. The recording/reproducing method as claimed in claim 5, wherein
a positional information which enables the data position to be identified is appended to the compressed data and the resulting compressed data is recorded in the second recording medium in the third step, and
the data position is identified based on the positional information in the fifth step.

7. The recording/reproducing method as claimed in claim 5, wherein
number of buffering frames is counted when the first uncompressed data is read from the first recording medium so that a first count value is generated in the first step,
the compressed data is read from the second recording medium, starting from a leading data thereof, and number of frames of the read compressed data is counted so that a second count value is generated in the fourth step, and
the storage position is identified based on the first count value when the recording of the predefined unit volume of the compressed data in the second recording medium is completed, and the first count value and the second value are compared with each other so that the data position is identified based on a comparison result thereby obtained in the fourth step.

8. The recording/reproducing method as claimed in claim 1, wherein
the uncompressed data is an assembly of n (n is a natural number) number of content data including audio data or video data, and
the predefined unit volume is equal to a volume of one or m (m is a natural number equal to or smaller than n) number of the content data.

9. The recording/reproducing method as claimed in claim 1, wherein
the first recording medium is an optical disc, and
the second recording medium is a hard disc.

10. A recording/reproducing device, comprising:
a buffer memory functioning as a working buffer memory;
a reading unit configured to read an uncompressed data from a first recording medium;
a first decoding unit configured to generate a first decoded data by decoding the uncompressed data and storing the generated first decoded data in the buffer memory;
a compression recording unit configured to read the first decoded data from the buffer memory at a speed higher than a normal reproduction speed of the uncompressed data to generate a compressed data and record the generated compressed data in a second recording medium;
a decompression unit configured to read the compressed data from the second recording medium at a speed higher than the normal reproduction speed and decompress the read compressed data to generate a decompressed data;
a second decoding unit configured to generate a second decoded data by decoding the decompressed data and store the generated second decoded data in the buffer memory; and
a unit-volume recording completion monitoring unit configured to monitor whether a predefined unit volume of the compressed data is recorded in the second recording medium to determine whether the second decoded data should be stored in the buffer memory in place of the first decoded data based on a monitoring result thereby obtained, wherein
the unit-volume recording completion monitoring unit allows the first decoded data to be recorded in the buffer memory when it is determined that the predefined unit volume of the compressed data is not yet recorded in the second recording medium, and
the unit-volume recording completion monitoring unit suspends the recording of the first decoded data outputted from the first decoding unit in the buffer memory and then allows the second decoded data to be recorded in the buffer memory when it is determined that the predefined unit volume of the compressed data is already recorded in the second recording medium.

11. The recording/reproducing device as claimed in claim 10, wherein
the reading unit reads the uncompressed data from the first recording medium at a speed higher than the normal reproduction speed.

12. The recording/reproducing device as claimed in claim 10, further comprising a reproduction unit configured to analog-output the first decoded data or the second decoded data at the normal reproduction speed,
the reproduction unit reproduces the first decoded data at the normal reproduction speed when the unit-volume recording completion monitoring unit determines that the recording of the predefined unit volume of the compressed data in the second recording medium is not yet completed, and
the reproduction unit reproduces the second decoded data at the normal reproduction speed when the unit-volume recording completion monitoring unit determines that the recording of the predefined unit volume of the compressed data in the second recording medium is completed.

13. The recording/reproducing device as claimed in claim 12, further comprising a switchover unit configured to switch from one of the first decoded data and the second decoded data to the other and supply the selected decoded data to the reproduction unit,
the unit-volume recording completion monitoring unit outputs an instruction to switch to the first decoded data to the switchover unit after determining that the recording of the predefined unit volume of the compressed data in the second recording medium is not yet completed,
the unit-volume recording completion monitoring unit outputs an instruction to switch to the second decoded data to the switchover unit after determining that the recording of the predefined unit volume of the compressed data in the second recording medium is completed, and
the reproduction unit analog-outputs one of the first decoded data and the second decoded data outputted from the switchover unit.

14. The recording/reproducing device as claimed in claim 10, wherein
the decompression unit reads the compressed data from a data position of the compressed data in the second recording medium corresponding to a storage position of the first decoded data in the buffer memory when the recording of the predefined unit volume of the compressed data in the second recording medium is completed, and decompresses the read compressed data to generate the second decoded data, and
the second decoding unit stores the second decoded data in the buffer memory so that the second decoded data is continuous to the data position of the first decoded data.

15. The recording/reproducing device as claimed in claim 14, wherein
the compression recording unit appends a positional information which enables the data position to be identified to the compressed data and records the resulting compressed data in the second recording medium, and
the decompression unit identifies the data position based on the positional information.

16. The recording/reproducing device as claimed in claim 14, wherein
the reading unit counts number of buffering frames when the uncompressed data is read from the first recording medium to thereby generate a first count value,
the decompression unit reads the compressed data from the second recording medium, starting from a leading data thereof, and counts number of frames of the read compressed data to thereby generate a second count value, and
the decompression unit identifies the storage position based on the first count value when the recording of the predefined unit volume of the compressed data in the second recording medium is completed, and compares the first count value and the second value with each other so that the data position is identified based on a comparison result thereby obtained.

17. The recording/reproducing device as claimed in claim 10, wherein
the uncompressed data is an assembly of n (n is a natural number) number of content data including audio data or video data, and
the predefined unit volume is equal to a volume of one or m (m is a natural number equal to or smaller than n) number of the content data.

18. The recording/reproducing device as claimed in claim 10, wherein
the buffer memory is a ring buffer memory.

19. The recording/reproducing device as claimed in claim 10, wherein
the first recording medium is an optical disc, and
the second recording medium is a hard disc.

* * * * *